(12) United States Patent
Lapukhov et al.

(10) Patent No.: US 10,999,193 B1
(45) Date of Patent: *May 4, 2021

(54) MODULAR ARCHITECTURE FOR COMPUTER NETWORK OPERATIONS

(71) Applicant: Facebook, Inc., Menlo Park, CA (US)

(72) Inventors: Petr V. Lapukhov, Mountain View, CA (US); Paul M. Saab, San Francisco, CA (US); Omar Castillo Baldonado, Palo Alto, CA (US); James Williams, Montana, CA (US); Manikandan Somasundaram, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/822,777

(22) Filed: Mar. 18, 2020

Related U.S. Application Data (63) Continuation of application No. 16/162,930, filed on Oct. 17, 2018, now Pat. No. 10,693,774, which is a
(Continued)

(51) Int. Cl.
| | |
|---|---|
| *H04L 12/24* | (2006.01) |
| *H04L 12/753* | (2013.01) |
| *H04L 12/44* | (2006.01) |
| *H04L 12/705* | (2013.01) |
| *H04L 29/08* | (2006.01) |
| *H04L 29/06* | (2006.01) |
| *H04L 12/26* | (2006.01) |

(52) U.S. Cl.
CPC .......... *H04L 45/48* (2013.01); *H04L 12/44* (2013.01); *H04L 45/18* (2013.01); *H04L 67/1095* (2013.01); *H04L 67/1097* (2013.01); *H04L 41/12* (2013.01); *H04L 43/10* (2013.01); *H04L 63/08* (2013.01)

(58) Field of Classification Search
CPC . H04L 12/44; H04L 67/1097; H04L 67/1095; H04L 41/12; H04L 45/48; H04L 43/10; H04L 45/18
See application file for complete search history.

(56) References Cited

U.S. PATENT DOCUMENTS 7,872,989 B1  1/2011  Tong et al.
9,224,132 B1 * 12/2015  Knox .............. G06Q 50/18
(Continued)

OTHER PUBLICATIONS

Notice of Allowance received for U.S. Appl. No. 15/390,309 dated Jul. 17, 2018, 17 pages.
(Continued)

*Primary Examiner* — Kim T Nguyen
(74) *Attorney, Agent, or Firm* — FisherBroyles, LLP (57) ABSTRACT

Disclosed embodiments include a method of operation of a distributed network system. The method includes nodes of the network system that send messages over a protocol-independent message bus, and other nodes that receive the messages. Content from the received messages can be stored in a database distributed among nodes of the network system. At least some of the content stored in the database is published. The published content can be accessed by one or more applications to perform one or more functions.

23 Claims, 10 Drawing Sheets

Related U.S. Application Data continuation of application No. 15/390,309, filed on Dec. 23, 2016, now Pat. No. 10,135,724.

(60) Provisional application No. 62/333,602, filed on May 9, 2016.

(56) References Cited

U.S. PATENT DOCUMENTS

| | | | |
|---|---|---|---|
| 10,135,724 B2 * | 11/2018 | Lapukhov | H04L 45/18 |
| 2006/0184977 A1 * | 8/2006 | Mueller | H04N 21/26266 725/86 |
| 2017/0142004 A1 | 5/2017 | Äström et al. | |

OTHER PUBLICATIONS

Preinterview First Office Action received for U.S. Appl. No. 16/162,930 dated Aug. 22, 2019, 11 pages.
Notice of Allowance received for U.S. Appl. No. 16/162,930 dated Dec. 20, 2019, 26 pages.
Notice of Allowance received for U.S. Appl. No. 16/162,930 dated Feb. 12, 2020, 27 pages.

* cited by examiner

MODULAR ARCHITECTURE FOR COMPUTER NETWORK OPERATIONS

CROSS-REFERENCES TO RELATED APPLICATIONS

This application claims the benefit of commonly assigned U.S. Provisional Patent Application Ser. No. 62/333,602, filed on May 9, 2016, and entitled "MODULAR ARCHITECTURE FOR COMPUTER NETWORK," the disclosure of which is hereby incorporated herein in its entirety by reference.

TECHNICAL FIELD

The disclosed teachings relate generally to computer networks. More particularly, the disclosed teachings relate to a modular distributed network application framework.

BACKGROUND

Figure 1:
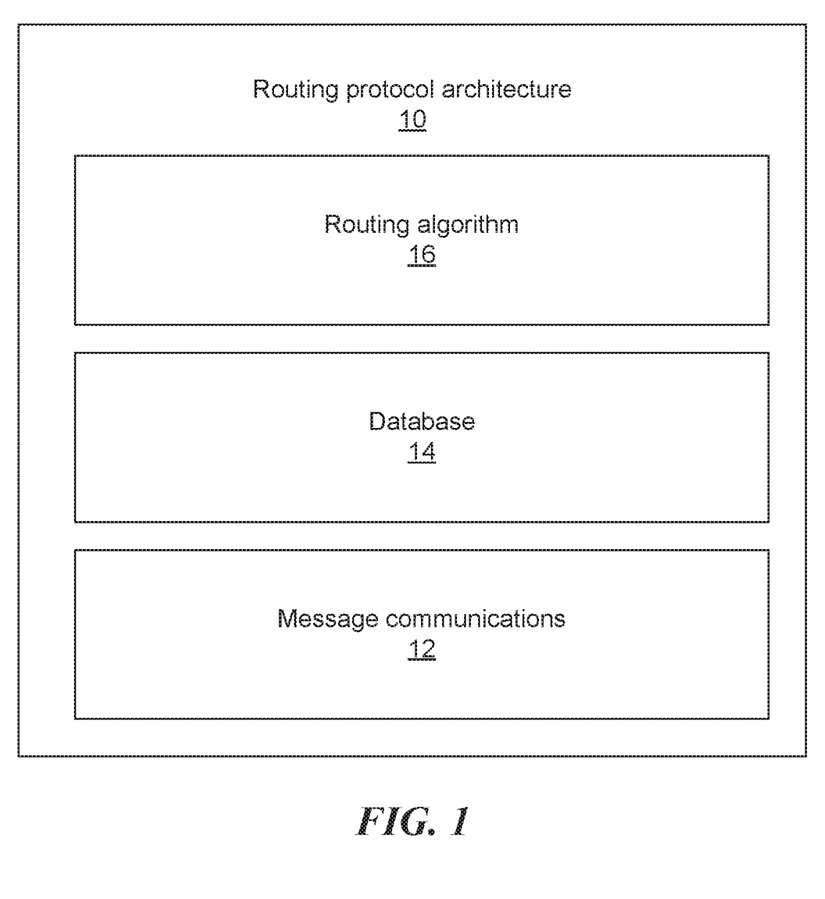
FIG. 1 is a block diagram illustrating a routing protocol architecture.

A routing protocol controls how nodes in a computer network system communicate with each other. The nodes are connected by links to form a topology in which the nodes disseminate messages over the network. The block diagram of FIG. 1 illustrates a conventional routing protocol architecture 10. The routing protocol architecture 10 includes a component for message communications 12, a database 14, and a routing algorithm 16. Messages are disseminated throughout the network of nodes in accordance with a process of the message communications 12.

The disseminated messages are stored in the database 14, distributed among the network of nodes. The content of the database 14 is used by the routing algorithm 16 to calculate routing paths, which are collectively stored in each node's routing table. The format, exchange, and synchronization of messages, as well as routing calculations, are all tightly integrated with the routing protocol architecture 10.

For example, link-state routing protocols, such as open shortest path first (OSPF) and intermediate system to intermediate system (IS-IS), include processes performed by each node to construct a topological map. The messages can be propagated over the network by using flooding, where every incoming packet is sent through every outgoing link except the one it arrived on. In this example, the routing protocols include a distributed database that stores link-state and prefix data used by each node to calculate paths to every destination in the network. The collection of paths forms the node's routing table.

Thus, the nodes use proprietary routing protocols to run rigid processes for message communications, synchronization, and calculating routing paths. The protocols are limited to performing routing functions and cannot scale well in networks that exceed 1,000 nodes because flooding scales poorly due to significant overhead, especially in meshed wireless networks.

DETAILED DESCRIPTION

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used here is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, refer to any connection or coupling, either direct or indirect, between two or more elements. The coupling or connection between the elements can be physical, logical, or a combination thereof.

The disclosed embodiments include an architecture that effectively transforms a routing protocol into a modular application development framework. The components of the framework are decoupled to enable independent operations. The disclosed embodiments include processes performed by a network that is segmented to enable efficient dissemination of messages. In some embodiments, code runs on each node of a network to disseminate messages (e.g., exchange and/or propagate messages) across the network of nodes. The term "message," as referred to herein, includes data such as a network packet and can be used interchangeably with the terms "data" or "information" unless the context suggests otherwise.

The architecture is agnostic to network topology, underlying transport protocols, and message payloads. Hence, a message is not limited to any specific format. The architecture includes modules that separate distribution, synchronization, and use of messages. These modules are independent functional components that can be optimized separately. As such, the architecture is flexible, scalable, and extensible to provide additional functionality over existing architectures that are limited only to routing protocols.

In particular, introduced here are at least one method, at least one system, and a node of the system. The at least one method includes a method of operation of a distributed network system. The method includes nodes of the network sending messages over a protocol-independent message bus, and other nodes receiving the sent messages. Content from the received messages can be stored in a database distributed among nodes of the network system. At least some of the content stored in the database is published. The published content can be accessed by applications to perform one or more functions.

In some embodiments, a distributed network application framework architecture includes a protocol-agnostic message bus connected to nodes of the network. The nodes can be configured to facilitate sending, receiving, or propagating messages over the protocol-agnostic message bus. The architecture can include a payload-agnostic database distributed across the nodes and storing content communicated over the message bus, and includes one or more applications utilizing the content stored in the database to perform one or more functions.

In some embodiments, a node of a distributed network system can include an interface to a protocol-agnostic message bus connected to nodes of the network system. The interface can facilitate sending, receiving, or propagating messages over the protocol-agnostic message bus. The node includes a database component of a payload-agnostic database distributed across the nodes of the network system. The database component can store content received over the protocol-agnostic message bus. The node can include one or more applications that use the content stored in the database component to perform one or more functions.

The disclosed architecture can implement, among others, functions of a link-state routing protocol, where such function can be optimized separately to allow for scaling in larger networks compared to conventional link-state networks. In contrast, existing routing protocols do not include component parts that can be optimized independently. Instead, the routing protocols themselves would need to be changed to perform optimization.

Figure 2:
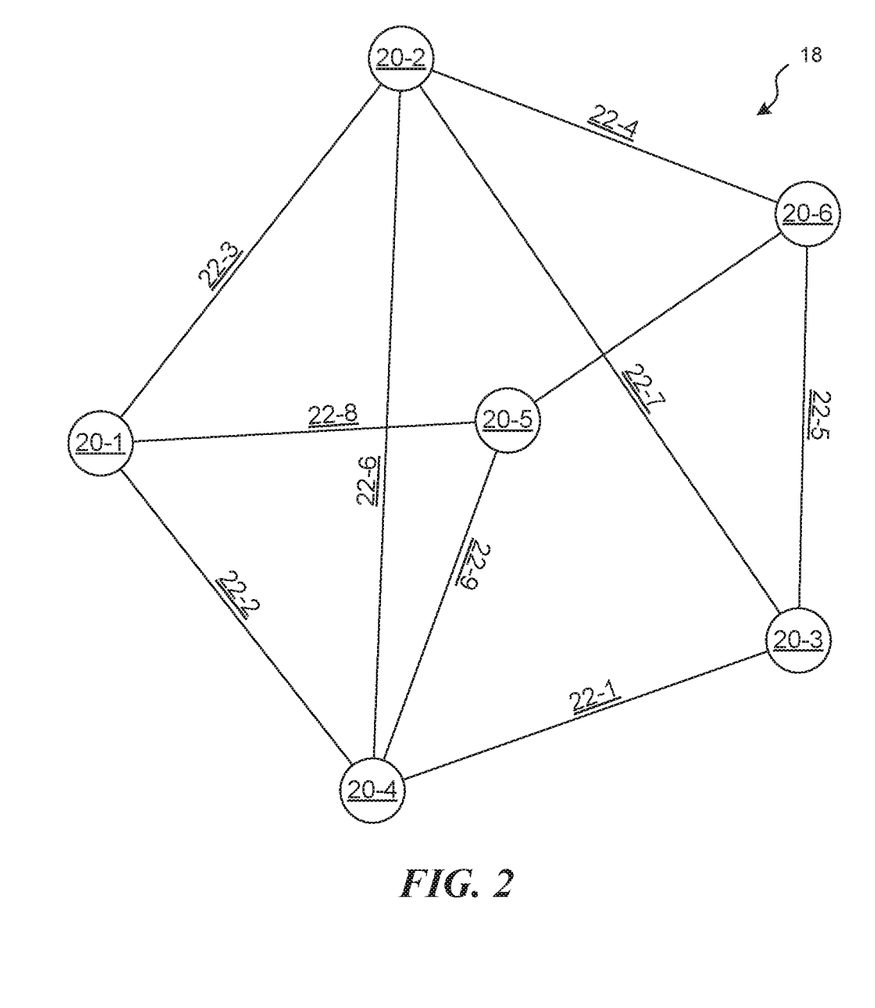
FIG. 2 illustrates a distributed network system topology according to some embodiments of the present disclosure.

FIG. 2 illustrates a distributed network system topology according to some embodiments of the present disclosure. The network 18 includes nodes 20 (collectively referred to as nodes 20 and individually as nodes 20-1 through 20-6). The nodes 20 may include any type of computing devices (e.g., server) that can provide a variety of services and/or data. The nodes 20 are interconnected by links 22. The links 22 may include any combination of private, public, wired, or wireless portions. Data communicated over the links 22 may be encrypted or unencrypted at various locations and along portions of the network 18.

The network 18 could be implemented as a backhaul, datacenter, backbone, and the like. For example, the network 18 could be implemented in a wireless backhaul that integrates the nodes 20. Further, the network 18 is not limited to the number of nodes 20 shown in FIG. 2. For example, the network 18 can include more than 1,000 or 2,000 nodes, which is greater than the maximum number of nodes in typical networks that implement conventional routing protocols.

Each component of the network 18 may include combinations of hardware and/or software to process data, perform functions, communicate over the network 18, and the like. For example, any component may include a processor, memory or storage, a network transceiver, a display, operating system and application software, and the like. Other components, hardware, and/or software included in the network 18 are well known to persons skilled in the art and, as such, are not shown or discussed herein.

Figure 3:
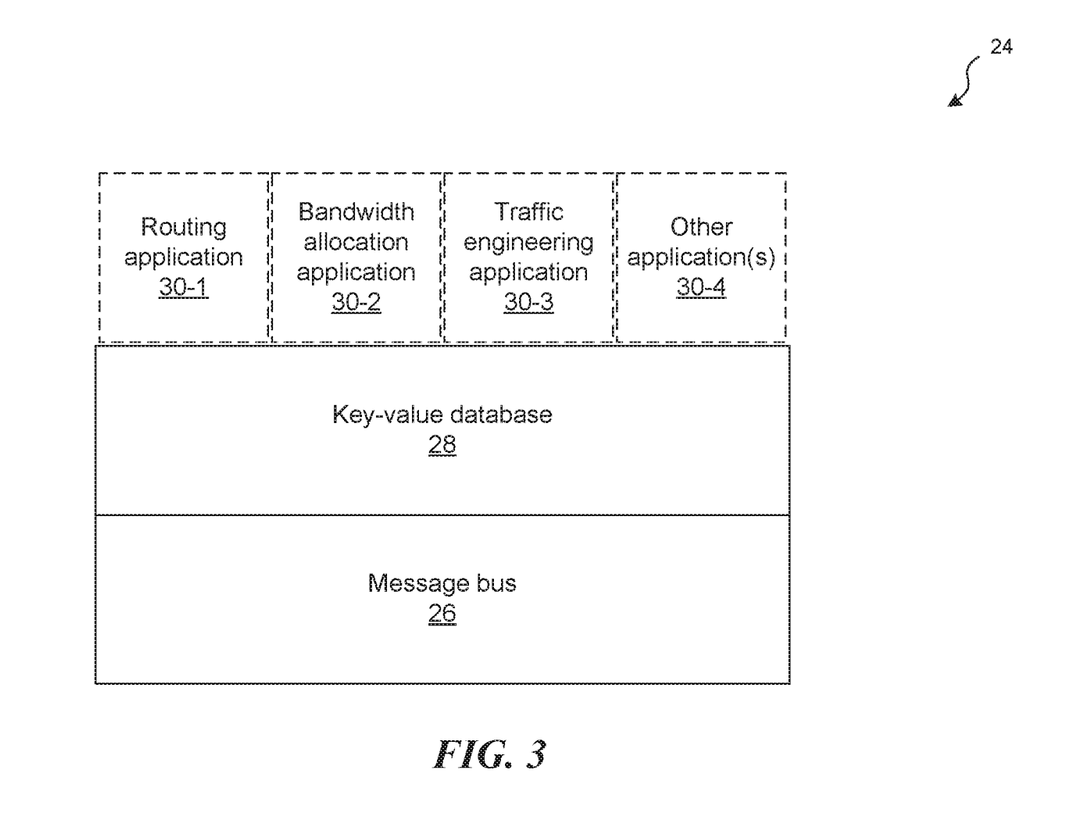
FIG. 3 is a block diagram that illustrates a modular architecture implemented in a network according to some embodiments of the present disclosure.

FIG. 3 is a block diagram that illustrates a modular architecture 24 implemented in the network 18 according to some embodiments of the present disclosure. The architecture 24 includes a message bus 26 and a key-value database 28 (hereinafter "database 28") as standalone components. In other words, the database 28 can operate independently of the message bus 26. The database 28 can be distributed among any of the nodes 20. As such, for example, each node 20 can have a database 28 component. Functionality can be built on top of these standalone components as applications 30 that use data published by the nodes 20, which is stored as the content in the database 28. For example, the published data can be used to perform functions, such as an address assignment function, an auditing function, a monitoring function, an adaptive control function, an optimization function, a machine learning function, or combinations thereof.

To aid in understanding, the architecture 24 can be viewed as a disaggregation and generalization of a routing protocol architecture into separate components, which allows for use and re-use of data published by the nodes 20, and stored in the database 28, for applications such as a routing application 30-1, a bandwidth allocation application 30-2, a traffic engineering application 30-3, and any other applications 30-4. In some embodiments, the applications 30 can be resident on any of the nodes 20 of the network 18 or nodes separate and distinct from the network 18.

In some embodiments, the message bus 26 can be implemented in a mesh network where each node cooperates to distribute messages in the network. In some embodiments, control of the architecture 24 can be centralized or distributed across the network 18. For example, a centralized controller could operate to push the messages over the network 18, and nodes may engage in distributed communications to control the network 18.

Figure 4:
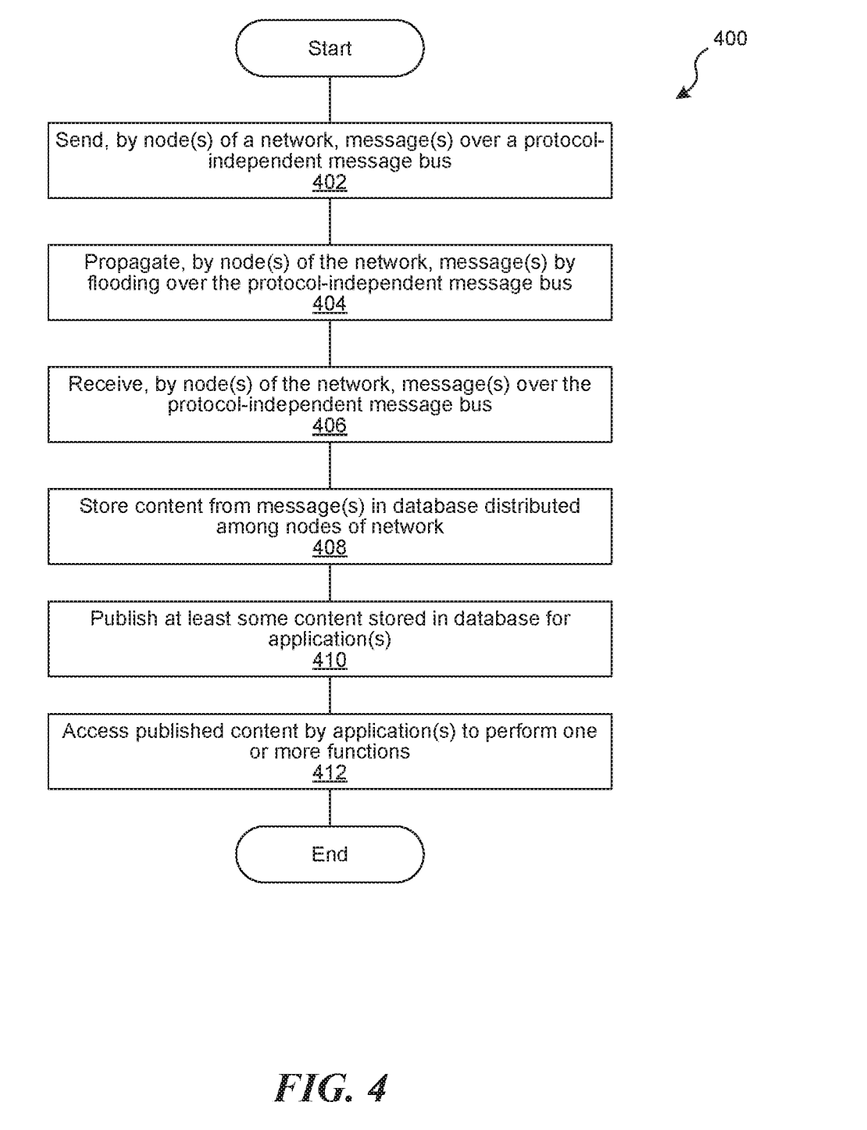
FIG. 4 is a flowchart illustrating a process for disseminating messages in a network according to some embodiments of the present disclosure.

FIG. 4 is a flowchart illustrating a process 400 for disseminating messages in the network 18 according to some embodiments of the present disclosure. In step 402, messages are sent by nodes of the network 18 over the message bus 26. For example, a subset of the nodes 20 can send messages with nodes 20 over the message bus 26. The message bus 26 is protocol-agnostic and payload-agnostic to carry the messages published by nodes 20 in any format. The message bus 26 includes a common data model, a common command set, and a messaging infrastructure to allow communications through shared interfaces. As such, any data can be sent anywhere in the network 18 over the message bus 26 without needing to be interpreted by any or all intermediate nodes.

The message bus 26 can be built by connecting the nodes 20 using transmission control protocol (TCP) connections in a peer-to-peer (P2P) fashion. The message bus 26 uses a software framework that provides scalable cross-language services. Specifically, the message bus 26 uses a common encoding for all data that is communicated over the message bus 26. An example of the software framework is Thrift, which is an interface definition language and binary communication protocol that can be used to define and create services for numerous languages.

The software framework can be used as a remote procedure call (RPC) framework and combines a software stack with a code generation engine to build services that work efficiently and seamlessly between C#, C++, Cappuccino, Cocoa, Delphi, Erlang, Go, Haskell, Java, Node.js, OCaml, Perl, PHP, Python, Ruby, Smalltalk, and other languages. Using the software framework to encode all data simplifies coding over routing protocols that define their own encoding. Other software frameworks that can be used include JSON, which is a language-independent data format, XML, and the like.

In step 404, nodes of the network 18 can propagate messages over the message bus 26 to other nodes of the network 18. For example, at least some of the messages sent from a subset of the nodes 20 can be propagated by another subset of the nodes 20 over the network 18. Flooding can be used as a common approach to propagate messages over the topology of nodes 20. Detailed further below are techniques that curtail the undesirable effects of flooding (e.g., excessive overhead) to improve scalability.

In step 406, nodes of the network 18 receive the messages sent and/or propagated by other nodes of the network 18. For example, a subset of the nodes 20 can receive messages that were sent and/or propagated by other subsets of the nodes 20. In this context, a node that is said to "receive" a message is a node that consumes the content of the message, whereas a node that is said to "propagate" a message is a node that relays the message without necessarily consuming its content. As such, any of the nodes 20 can send, receive, and/or propagate messages.

In step 408, content included in the disseminated messages is stored in the database 28 (e.g., consumed). The database 28 is topology-independent and decoupled from an underlying protocol. The "key values" of the database 28 refer to a data storage paradigm designed for storing, managing, and publishing objects that have many different fields within them, each containing data. These objects are stored and retrieved using a key that uniquely identifies the object and is used to find the data within the key-value database. The database 28 of the disclosed architecture may have no limit on key or value size.

In step 410, at least some of the content stored in the database 28 is published such that it is made available to the applications 30. The database 28 stores any type of content as keys and values. The content is encoded as objects using a scalable cross-language software framework (e.g., Thrift encoded objects). Lastly, in step 412, the applications 30 can independently use and re-use the content stored in the database 28 to perform a variety of functions, in addition to or instead of routing. Examples of the variety of functions include an address assignment function, an auditing function, a monitoring function, an adaptive control function, an optimization function, a machine learning function, or any other computation that could be performed in a distributed manner.

In some embodiments, content stored in the database 28 can be updated with the payload of the disseminated messages. For example, existing content of the database 28 can be synchronized with new content included in the disseminated messages. In some embodiments, the existing content in the database 28 can be associated with one or more timestamps. The existing content can be designated as expired (i.e., stale) content upon exceeding a period of time stored in the database 28 relative to the one or more timestamps. The stale content can be removed or replaced with new content from the disseminated messages. In some embodiments, existing content stored in the database 28 may not expire, and new content can replace the existing content upon exceeding a threshold storage limit of the database 28. Hence, the database 28 can be continuously updated with new content from disseminated messages as if the database has an infinite storage capacity. As such, the database 28 can be continuously updated with new content for use and re-use by applications to perform various functions.

Figure 5:
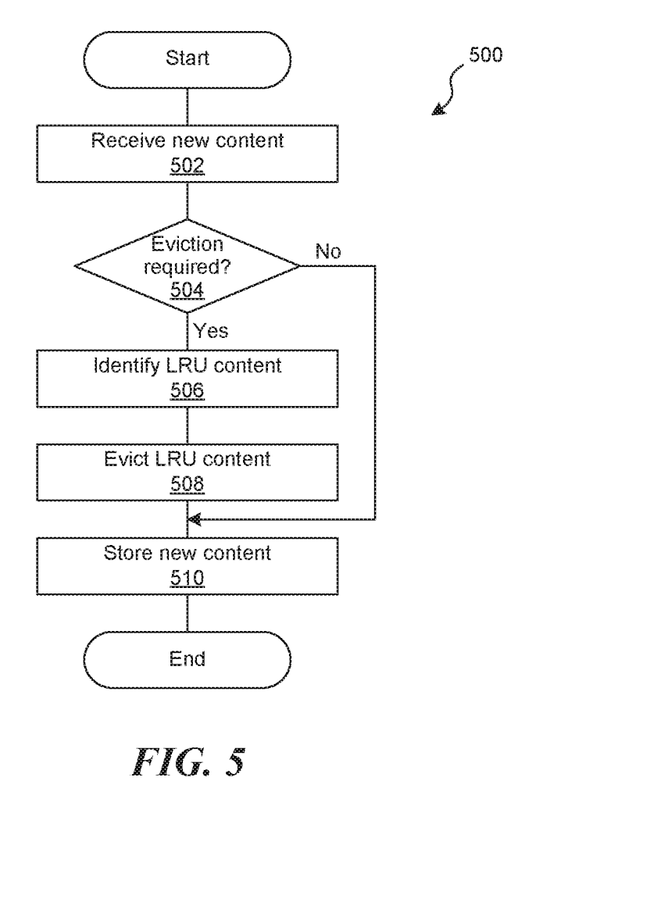
FIG. 5 is a flowchart illustrating a process for updating and synchronizing a database of the architecture according to some embodiments of the present disclosure.

In another embodiment, a process for updating the database 28 may employ eviction logic. For example, FIG. 5 is a flowchart illustrating a process 500 for updating and synchronizing the database 28 according to some embodiments of the present disclosure. In step 502, new content is obtained from the payload of messages received over the message bus 26 among the nodes 20. In step 504, database logic can determine whether eviction of existing content is required to store the new content (e.g., keys and values). If eviction is not required, the new content is simply stored in the database 28.

In step 506, if eviction is required, a cache algorithm can be used to identify content that is least recently used (LRU) by applications as candidates for the eviction. In step 508, the LRU content is removed from the database 28. Lastly, in step 510, the database 28 stores the new content in entries that contained the now-evicted LRU content.

The database 28 is not purely event driven. Instead, the database 28 may implement an anti-entropy protocol where database components of adjacent (directly connected) nodes 20 periodically synchronize their contents. This synchronization allows the architecture 24 to avoid global network state refresh operations (state aging and re-flooding) that otherwise occur in IS-IS and OSPF routing protocols.

As indicated above, having the message bus 26 and the database 28 decoupled from the applications 30 improves the extensibility of the architecture 24. In particular, applications other than a mere routing application can use the content from messages distributed over the network 18. In contrast, introducing a new application (other than routing) in traditional systems may be impossible without adding a new underlying protocol. Yet the architecture 24 can add any applications to the network 18 without requiring additional protocols because, for example, the message bus 26 can exchange data in any format.

Thus, embodiments of the architecture 24 are not limited to a network routing application. Instead, the architecture 24 could send any data over the network 18 and publish that data for use by any of the applications 30. The applications 30 can operate independently of the message bus 26, the database 28, and each other. In fact, only the applications 30 need to interpret the content from the messages. That is, the message bus 26 and database 28 do not need to interpret the content. Any number and type of applications 30 can be built on top of the message bus 26 and the database 28. The applications 30 can use and re-use the stored content to perform associated functions, such as, for example, layer 3 routing, performance-based routing, multiprotocol label switching, and the like.

For example, the routing application 30-1 could include a link-state routing algorithm that uses link-state data published by every node 20 and stored in the database 28. The routing algorithm could use the link-state data to compute routing paths. As such, the routing application 30-1 uses information obtained by nodes 20 and published globally to obtain a network graph. The architecture 24 allows other applications to use or re-use the published data for other functions.

For example, the bandwidth allocation application 30-2 could compute fair queueing weights for network topologies where traffic flows to or from a single network exit or entry point. The computation is based on the measurements and global publications of the live traffic closer to the edge nodes 20 of the network 18 where traffic consumers reside. Thus, the architecture 24 can build fair traffic distribution model in the network 18. Hence, the architecture 24 is extensible to allow numerous and diverse applications 30 to be built on the message bus 26 and database 28 to perform functions that are otherwise not readily available in existing architectures.

As indicated above, messages can be propagated by some of the nodes 20 over the network 18 by using flooding, which cannot scale well due to excessive flooding overhead. The architecture 24 overcomes these drawbacks by implementing a combination of techniques that curtail the undesirable effects of flooding.

Figure 6:
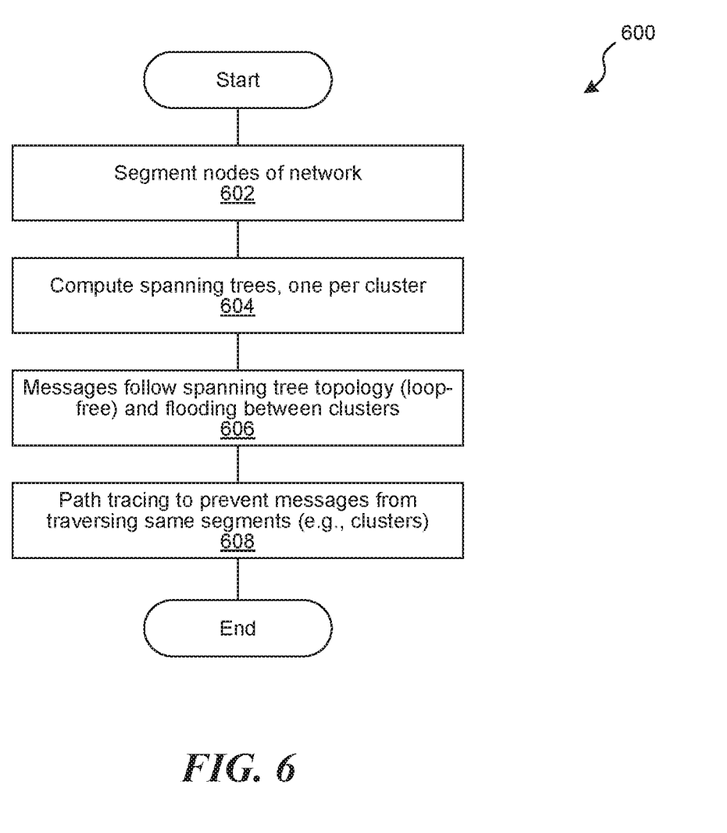
FIG. 6 is a flowchart illustrating a process for mitigating the undesirable effects of flooding according to some embodiments of the present disclosure.

FIG. 6 is a flowchart illustrating a process 600 for mitigating the undesirable effects of flooding when propagating messages according to some embodiments of the present disclosure. In step 602, various techniques are implemented to segment the network 18 into different groups of nodes 20. As such, flooding overhead can be mitigated by preventing messages from repeatedly traversing the same segment. Examples of these techniques include spanning trees, clustering, and path tracing.

In step 604, spanning trees are computed over segments of the network 18. Each segment of the network 18 covered by a single spanning tree can be considered a cluster. For example, a spanning tree algorithm can be distributed across the nodes 20. The distributed spanning tree algorithm can run using a hello protocol to compute the spanning trees, as detailed further below. The spanning tree algorithm computes logical loop-free topologies, including one or more spanning trees.

Figure 7:
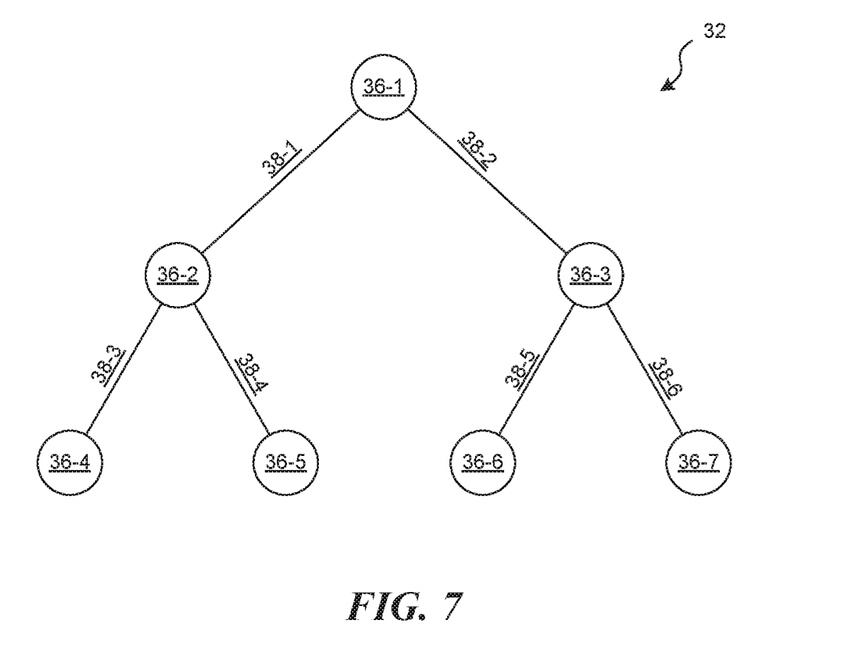
FIG. 7 illustrates a spanning tree topology according to some embodiments of the present disclosure.

FIG. 7 illustrates a spanning tree topology 32. The spanning tree topology 32 has a single active path 38 between any two nodes 36. The spanning tree topology 32 can constitute a cluster. In some configurations, portions of the spanning tree topology 32 can form different clusters. As such, the spanning tree algorithm can perform clustering of the nodes 20 in the network 18. The network 18 can be segmented into a number of distinct clusters ranging from one to the total number of nodes 20. For example, the entire network 18 could constitute a single cluster, or each node 20 could constitute a single cluster.

Referring back to FIG. 6, in step 604, messages distributed within a cluster can follow the spanning tree loop-free topology, and message flooding can occur between clusters. Clusters could be used to control message exchange such that a message is prevented from traversing the same cluster. This is particularly beneficial in network topologies that are uniform, such as datacenters, to improve the efficiency of data exchange.

Path tracing can be applied to limit the flooding. Path tracing is a process used to determine the path taken by a message propagated in a network. In some embodiments, the process of path tracing includes a data format defined by the message bus 26. The format could have custom fields that include path information such as a node or a group of nodes that was traversed by a message. Information about the path taken by a message can be used to prevent a message from traversing the same node or group of nodes in a flooding exchange.

For example, in step 608, a node can drop a packet that has already traversed that node or traversed a group of nodes to which the node belongs (e.g., cluster). For example, messages can be appended with cluster identifiers as they traverse clusters in the network 18. A node can drop a message that already traversed its cluster. Moreover, every message sent by a node 20 can include a "hop count," which permits the network 18 to drop messages that are caught in transient routing loops. As such, flooding overhead is curtailed by limiting flooding in the network 18.

Scaling is improved by segmenting the network 18 because flooding overhead is curtailed. For example, networks can be scaled to include 8,000 or more nodes. The number of clusters that include spanning trees could be calculated to provide a desired scalability by reducing overhead in the network. In some embodiments, the network 18 could be configured to flood information in a similar manner as OSPF/IS-IS with additional flooding loop checks via path tracing. Further, segmenting can also protect against flooding storms, and would improve the efficiency of applications 30 using content in the database 28 obtained via flooding.

As such, for example, the combination of spanning-tree forwarding within clusters and path-tracing between clusters used to drop messages reduces flooding overhead, yet maintains efficient message propagation in the network 18, in contrast to using conventional flooding, which has the greatest propagation delay but maximum overhead. In contrast, a single global spanning tree would have the least overhead, but the longest message propagation delays.

The architecture 24 can include modules used to build and maintain a network of nodes. For example, a hello protocol module can perform processes for establishing and maintaining relationships between neighboring nodes. The hello protocol module enables bidirectional data exchange between neighboring nodes to discover nodes newly connected to the network 18, detect changes of the nodes in the network 18, and calculate metrics for optimizing flooding. The hello protocol module runs independently of the message bus 26.

Figure 8:
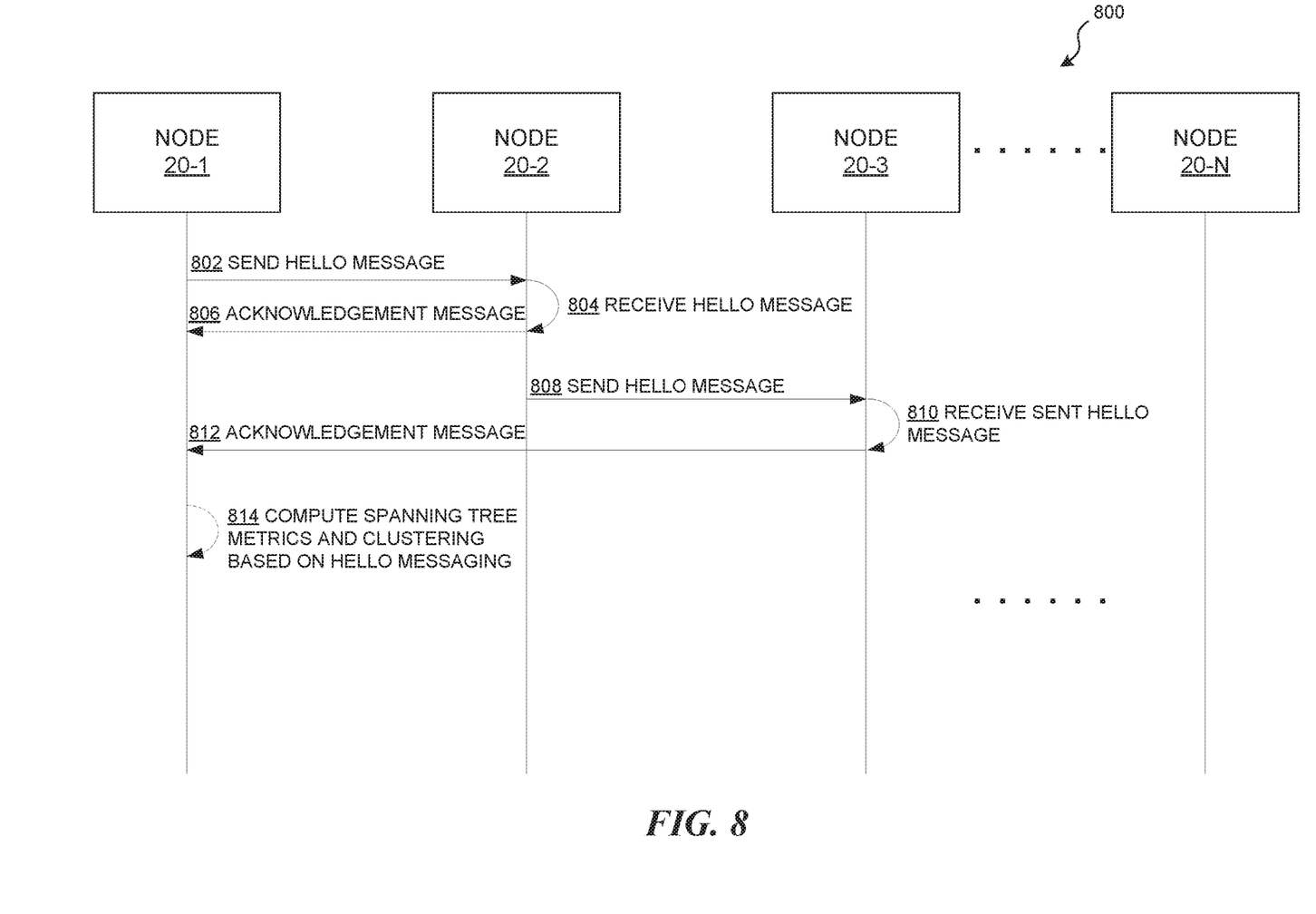
FIG. 8 is a sequence diagram illustrating a process performed by a hello protocol module according to some embodiments of the present disclosure.

FIG. 8 is a sequence diagram 800 that illustrates a hello protocol process between neighboring nodes according to some embodiments of the present disclosure. The disclosed hello protocol involves software code running on each node 20 of the network 18, which initiates a flooding exchange of a "hello message" sent by a node 20. The hello messages can be sent across the network 18 over connecting links. The hello messages could be sent in-band with other messages, or out-of-band.

In step 802, the node 20-1 sends a hello message to a neighboring node 20-2. In step 804, the node 20-2 receives the hello message from node 20-1. In step 806, the node 20-2 responds back to node 20-1 with an acknowledgement that it received the hello message. In step 808, the node 20-2 sends the received hello message to the neighboring node 20-3. In step 810, the node 20-3 receives the hello message from node 20-2. In step 812, the node 20-3 responds to node 20-1 with an acknowledgement that it received the hello message. The node 20-3 subsequently continues to flood the network 18 of nodes 20-N. The receiving nodes respond back to the originating node 20-1, and sends the hello message forward to other nodes 20.

Each node 20 can run a process of the hello protocol to discover neighboring nodes and then possibly create transport connections for the message bus 26. For example, the hello process can be used by a new node to announce its presence in a network. For example, the node 20-1 may be a new node, and nodes 20-2 through 20-N may be existing nodes of the network 18. The hello message may include the sending node's address for forming a connection and a discovery requirement. In some embodiments, hello messages can also be sent out periodically by all nodes 20-1 through 20-N of the network to confirm existing connections. Flooding of the hello messages can also be limited by path tracing, spanning trees, clustering, and the like.

The hello protocol process of FIG. 8 can be used to compute spanning tree metrics and organize the network into clusters, in addition to discovering neighboring nodes. For example, in step 814, the node 20-1 can compute spanning tree metrics based on the hello messaging. For example, spanning tree metrics and clustering can be computed using a distributed algorithm running on the nodes 20 based on node-to-node latency measurements obtained from acknowledgements received from nodes 20-2 through 20-N. As such, the hello protocol could be used for running the spanning-tree algorithm to automate clustering.

As shown, the hello protocol process establishes bidirectional communications between neighboring nodes. In particular, the hello protocol process could be used to exchange data between nodes 20 in the same link 22, without initiating global flooding. Moreover, the hello protocol could be used for "lazy flooding" to propagate some configuration parameters that control the message bus 26 behavior over a subset of the nodes 20 of the network 18. Moreover, the hello protocol includes functionality to provide bidirectional neighbor discovery. For example, an existing node that broadcasts a hello message can discover a new node that responded to the hello message.

The architecture 24 can include a security module to authenticate nodes and encrypt messages communicated over the message bus 26. In contrast, traditional routing protocols provide for authenticating communications only by using keyed hash-based signatures. For example, in some embodiments, public-key security is used to authenticate hello messages, and private/public-key encryption/decryption is used for all messages communicated over the message bus 26 between neighboring nodes 20.

Figure 9:
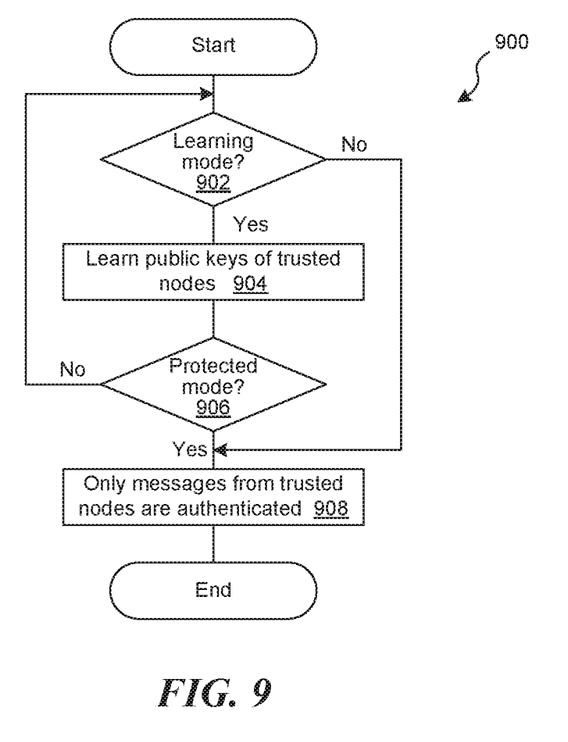
FIG. 9 is a flowchart illustrating a process performed by a security module of the architecture according to some embodiments of the present disclosure.

FIG. 9 is a flowchart illustrating a process 900 performed by a security module of the architecture 24 according to some embodiments of the present disclosure. The security module of the architecture 24 may operate the nodes 20 in different modes, including a learning mode and a protected mode. In step 902, a determination is made about whether the nodes 20 are in a learning mode. In step 904, while in the learning mode, the nodes 20 learn of public keys of other nodes. Nodes of corresponding public keys learned while the nodes 20 are in the learning mode are deemed as trusted nodes. Otherwise, in step 908, only messages from trusted nodes are authenticated by the nodes.

In step 906, a determination is made about whether the nodes 20 are running in a protected mode. In step 908, while the nodes 20 are in protected mode, only messages from trusted nodes are authenticated by the security module. Otherwise, the process 900 returns to the beginning. As such, the information required for authentication is distributed among nodes in a manner that avoids the complicated public key distribution process of conventional systems.

Figure 10:
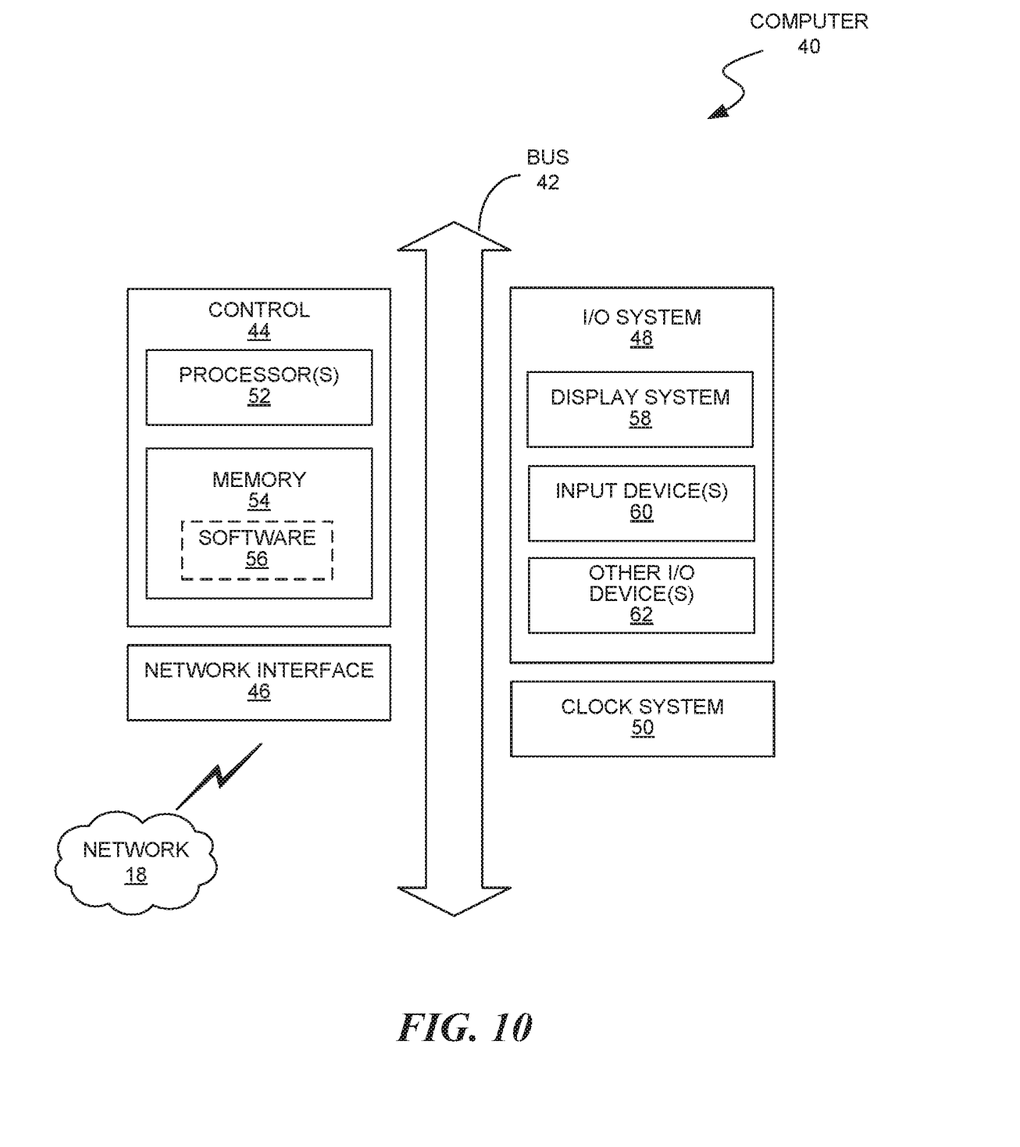
FIG. 10 is a block diagram of a computer operable to implement the disclosed technology according to some embodiments of the present disclosure.

FIG. 10 is a block diagram of a computer 40 (e.g., node 20) of the network 18 operable to implement the disclosed technology according to some embodiments of the present disclosure. The computer 40 may be a generic computer or specifically designed to carry out features of the network 18. For example, the computer 40 may be a System-On-Chip (SOC), a Single-Board Computer (SBC) system, a desktop or laptop computer, a kiosk, a mainframe, a mesh of computer systems, a handheld mobile device, or combinations thereof.

The computer 40 may be a standalone device or part of a distributed system that spans multiple networks, locations, machines, or combinations thereof. In some embodiments, the computer 40 operates as a server computer or a client device in a client-server network environment, or as a peer machine in a peer-to-peer system. In some embodiments, the computer 40 may perform one or more steps of the disclosed embodiments in real time, near real time, offline, by batch processing, or combinations thereof.

The computer 40 includes a bus 42 operable to transfer data between hardware components. These components include a control 44 (i.e., processing system), a network interface 46, an Input/Output (I/O) system 48, and a clock system 50. The computer 40 may include other components not shown nor further discussed for the sake of brevity. One having ordinary skill in the art will understand any hardware and software included but not shown in FIG. 10.

The control 44 includes one or more processors 52 (e.g., Central Processing Units (CPUs), Application Specific Integrated Circuits (ASICs), and/or Field Programmable Gate Arrays (FPGAs)) and memory 54 (which may include software 56). The memory 54 may include, for example, volatile memory such as random-access memory (RAM) and/or non-volatile memory such as read-only memory (ROM). The memory 54 can be local, remote, or distributed.

A software program (e.g., software 56), when referred to as "implemented in a computer-readable storage medium," includes computer-readable instructions stored in a memory (e.g., memory 54). A processor (e.g., processor 52) is "configured to execute a software program" when at least one value associated with the software program is stored in a register that is readable by the processor. In some embodiments, routines executed to implement the disclosed embodiments may be implemented as part of operating system (OS) software (e.g., Microsoft Windows®, Linux®) or a specific software application, component, program, object, module or sequence of instructions referred to as "computer programs."

As such, the computer programs typically comprise one or more instructions that are set at various times in various memory devices of a computer (e.g., computer 40) and which, when read and executed by at least one processor (e.g., processor 52), cause the computer to perform operations to execute features involving the various aspects of the disclosure embodiments. In some embodiments, a carrier containing the aforementioned computer program product is provided. The carrier is one of an electronic signal, an optical signal, a radio signal, or a non-transitory computer-readable storage medium (e.g., the memory 54).

The network interface 46 may include a modem or other interfaces (not shown) for coupling the computer 40 to other computers over the network 18. The I/O system 48 may operate to control various I/O devices, including peripheral devices such as a display system 58 (e.g., a monitor or touch-sensitive display) and one or more input devices 60 (e.g., a keyboard and/or pointing device). Other I/O devices 62 may include, for example, a disk drive, printer, scanner, or the like. Lastly, the clock system 50 controls a timer for use by the disclosed embodiments.

Operation of a memory device (e.g., memory 54), such as a change in state from a binary one to a binary zero (or vice versa), may comprise a visually perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electrical or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the distribution.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

We claim:

1. A computer-implemented method comprising:
   sending, by a first subset of a plurality of nodes, one or more messages over a protocol-independent message bus;
   receiving, by a second subset of the plurality of nodes, the one or more messages sent over the protocol-independent message bus;
   storing content from the one or more messages in a database distributed among at least the second subset of the plurality of nodes that received the one or more messages; and
   publishing the content stored in the database to provide published content, the published content being accessible by a plurality of applications to perform one or more functions.

2. The computer-implemented method of claim 1, further comprising, prior to receiving the one or more messages by the second subset of the plurality of nodes:
   propagating, by a third subset of the plurality of nodes, at least one of the one or more messages sent by the first subset of the plurality of nodes over the protocol-independent message bus in accordance with a flooding exchange.

3. The computer-implemented method of claim 1, further comprising, prior to receiving the one or more messages by the second subset of the plurality of nodes:
   segmenting the plurality of nodes into a plurality of clusters, each cluster including one or more nodes of the plurality of nodes;
   propagating, among the plurality of clusters, the one or more f messages over the protocol-independent message bus in accordance with a flooding exchange.

4. The computer-implemented method of claim 3, wherein segmenting the plurality of nodes into the plurality of clusters comprises:
   determining one or more spanning trees configured to send messages over nodes in a loop-free manner over the protocol-independent message bus, wherein each of the one or more spanning trees forms a cluster of the plurality of clusters.

5. The computer-implemented method of claim 4, further comprising:
   performing path tracing to determine a plurality of paths taken by the one or more messages traversing nodes of the plurality of nodes; and
   preventing a subset of the one or more messages from traversing a subset of the plurality of clusters when the subset of the one or more messages has previously traversed the subset of the plurality of clusters.

6. The computer-implemented method of claim 1, wherein the plurality of applications comprises at least one of a routing application, a bandwidth allocation application, or a traffic engineering application.

7. The computer-implemented method of claim 1, wherein the plurality of applications are distributed among at least two of the plurality of nodes.

8. The computer-implemented method of claim 1, wherein the plurality of applications are resident on one or more nodes separate and distinct from an associated network system.

9. The computer-implemented method of claim 1, wherein the content stored in the database is periodically synchronized between nodes of the plurality of nodes that have a common link.

10. The computer-implemented method of claim 1, wherein the database is a key-value database that does not limit keys or values to a maximum size.

11. The computer-implemented method of claim 1, wherein the database includes existing content associated with one or more timestamps and the content from the one or more messages is new content, and storing the new content in the database comprises:
    designating the existing content as expired content upon exceeding a period of time stored in the database relative to the one or more timestamps; and
    replacing the expired content included in the database with the new content from the one or more messages.

12. The computer-implemented method of claim 1, wherein the database includes existing content and the content from the one or more messages is new content, and storing the new content in the database comprises:
    designating a subset of the existing content to be replaced with the new content; and
    replacing the subset of the existing content with the new content.

13. The computer-implemented method of claim 1, further comprising:
    sending a hello message over a common connecting link from a first node of the plurality of nodes to a second node of the plurality of nodes;

receiving an acknowledgement message by the first node from the second node, the acknowledgement message acknowledging the reception of the hello message by the second node;

sending the hello message over a common connecting link from the second node to a third node of the plurality of nodes; and receiving an acknowledgement message by the first node from the third node, the acknowledgement message acknowledging the reception of the hello message by the third node.

14. The computer-implemented method of claim 1, wherein an associated network system comprises a hello protocol module for sending messages between any two nodes of the plurality of nodes being directly connected to a common link, the hello protocol module being used to perform any of computing spanning tree metrics, automating clustering of the plurality of nodes, or providing bidirectional discovery of neighboring nodes.

15. The computer-implemented method of claim 1, wherein the method further comprises:

operating the plurality of nodes in a learning mode during which the plurality of nodes learn of public keys of the plurality of nodes, wherein the plurality of nodes having the public keys learned during the learning mode are trusted nodes; and operating the plurality of nodes in a protected mode during which the plurality of nodes accept messages over the protocol-independent message bus only from the trusted nodes.

16. The computer-implemented method of claim 1, wherein the database is a key-value database comprising Thrift-encoded keys and values.

17. The computer-implemented method of claim 1, wherein the message bus utilizes a software framework that provides scalable cross-language services for communicating messages among the plurality of nodes.

18. The computer-implemented method of claim 1, wherein messages sent over the protocol-independent message bus are Thrift encoded.

19. The computer-implemented method of claim 1, wherein the one or more messages comprise one or more messages that include content that is encoded in accordance with different coding languages and have different formats.

20. The computer-implemented method of claim 1, wherein an associated network system is comprised in a backhaul, datacenter, or backbone network.

21. The computer-implemented method of claim 1, wherein the one or more functions comprises at least one of an address assignment function, an auditing function, a monitoring function, an adaptive control function, an optimization function, or a machine learning function.

22. A system comprising:

at least one physical processor; and physical memory comprising computer-executable instructions that, when executed by the at least one physical processor, cause the at least one physical processor to:

send, by a first subset of a plurality of nodes, one or more messages over a protocol-independent message bus;

receive, by a second subset of the plurality of nodes, the one or more messages sent over the protocol-independent message bus;

store content from the one or more messages in a database distributed among at least the second subset of the plurality of nodes that received the one or more messages; and publish the content stored in the database to provide published content, the published content being accessible by a plurality of applications to perform one or more functions.

23. A non-transitory computer-readable medium comprising one or more computer-executable instructions that, when executed by at least one processor of a computing device, cause the computing device to:

send, by a first subset of a plurality of nodes, one or more messages over a protocol-independent message bus;

receive, by a second subset of the plurality of nodes, the one or more messages sent over the protocol-independent message bus;

store content from the one or more messages in a database distributed among at least the second subset of the plurality of nodes that received the one or more messages; and publish the content stored in the database to provide published content, the published content being accessible by a plurality of applications to perform one or more functions.

\* \* \* \* \*